(12) United States Patent
Ruscil et al.

(10) Patent No.: US 7,854,455 B2
(45) Date of Patent: Dec. 21, 2010

(54) ANIMAL FECES COLLECTION AND DISPOSAL APPARATUS

(76) Inventors: Monica Ruscil, 306 Eighth Ave., Asbury Park, NJ (US) 07712; Andrew E. Ruscil, 306 Eighth Ave., Asbury Park, NJ (US) 07712; Philip J. Blyskal, 26 Caraway Ct., Princeton, NJ (US) 08540; Edward T. Hawley, 11 Saint George Pl., Keyport, NJ (US) 07735

( * ) Notice: Subject to any disclaimer, the term of this patent is extended or adjusted under 35 U.S.C. 154(b) by 0 days.

(21) Appl. No.: 12/092,470

(22) PCT Filed: Jul. 2, 2007

(86) PCT No.: PCT/US2007/072624

§ 371 (c)(1),
(2), (4) Date: May 2, 2008

(87) PCT Pub. No.: WO2008/014088

PCT Pub. Date: Jan. 31, 2008

(65) Prior Publication Data

US 2009/0152884 A1    Jun. 18, 2009

Related U.S. Application Data

(60) Provisional application No. 60/820,268, filed on Jul. 25, 2006.

(51) Int. Cl.
*A01K 29/00*    (2006.01)
(52) U.S. Cl. ..................................... 294/1.5
(58) Field of Classification Search ............. 294/1.1, 294/1.3, 1.4, 1.5, 100; 15/257.1
See application file for complete search history.

(56) References Cited

U.S. PATENT DOCUMENTS

| | | | |
|---|---|---|---|
| 3,819,220 A | 6/1974 | Bredt | |
| 4,010,970 A | 3/1977 | Campbell | |
| 4,056,278 A | 11/1977 | Bau | |
| 4,466,647 A | 8/1984 | Spevak | |
| 4,852,924 A | 8/1989 | Ines | |
| 4,878,703 A | 11/1989 | Yoshioka | |
| 4,900,077 A * | 2/1990 | Beck | 294/1.3 |
| 5,193,870 A | 3/1993 | MacInnis et al. | |
| 5,403,050 A | 4/1995 | Searing et al. | |
| 5,683,129 A | 11/1997 | Jensen | |
| 5,718,469 A | 2/1998 | Ockerman | |
| 5,779,290 A | 7/1998 | Wilke | |
| 6,039,370 A | 3/2000 | Dooley, Jr. et al. | |
| 6,086,123 A | 7/2000 | Sowinski | |
| 6,237,972 B1 | 5/2001 | Jung | |

(Continued)

*Primary Examiner*—Dean J Kramer
(74) *Attorney, Agent, or Firm*—Fox Rothschild LLP; Perry M. Fonseca

(57) ABSTRACT

An animal waste collection system (10) designed for sanitary use consists of a hollow shaft (14), handle (12), light (70), a pair of resilient, curved arms (22, 24) and a plurality if self sealing bags (40). The operator of the device (10) initially loads a plastic bag (40) onto arms (22, 24) before walking the dog. When the animal shows signs of excreting, the bag (40) is placed under the rear of the animal to intercept the feces. Once the animal is finished excreting, the operator partially retracts the arms (22, 24), closing the bag (40), and walks to a disposal receptacle where the arms (22, 24) are then fully retracted and the sealed bag (40) is released.

20 Claims, 11 Drawing Sheets

U.S. PATENT DOCUMENTS

| | | |
|---|---|---|
| 6,386,606 B1 | 5/2002 | Marshall |
| 6,471,267 B2 | 10/2002 | Asazuma |
| 6,485,073 B2 | 11/2002 | Harrison |
| 6,554,335 B1 | 4/2003 | Kelly |
| 6,702,349 B2 | 3/2004 | Clements |
| 7,090,268 B2 | 8/2006 | Borman |

* cited by examiner

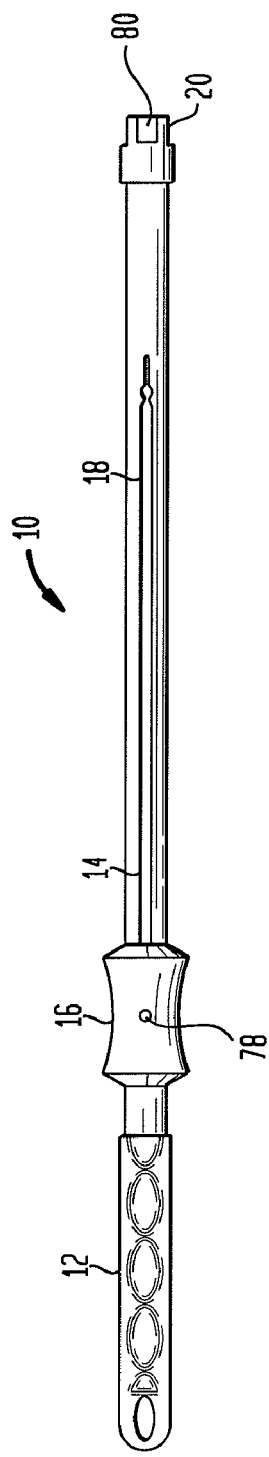
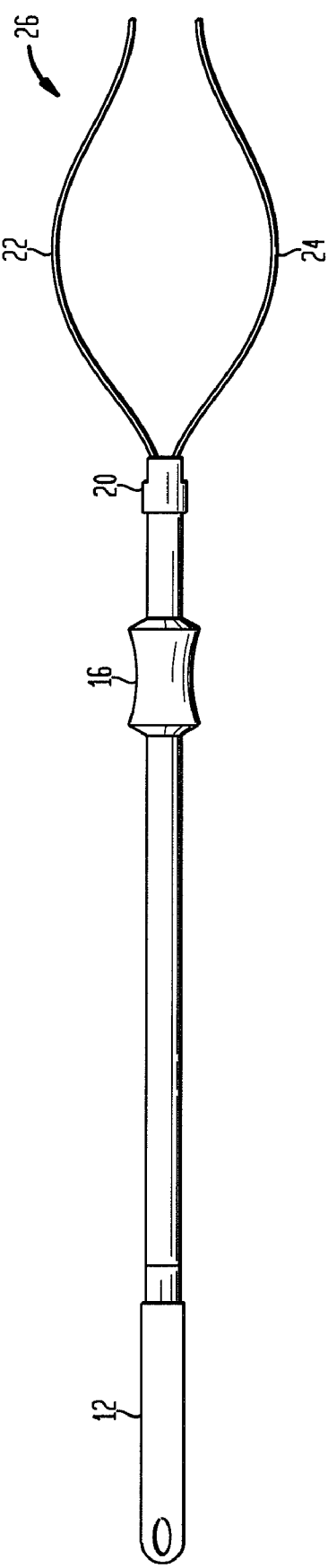
FIG. 1A
FIG. 1B

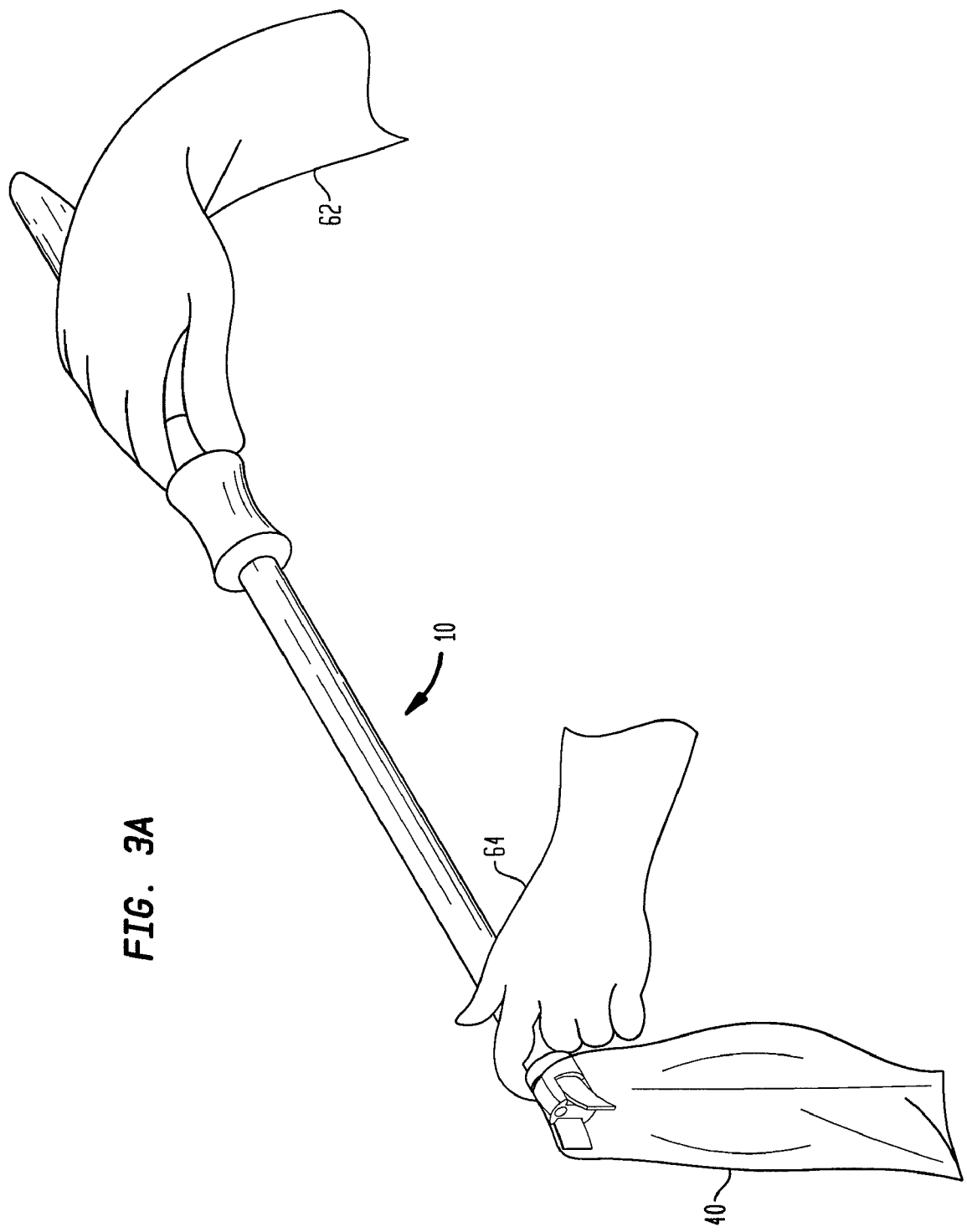

ANIMAL FECES COLLECTION AND DISPOSAL APPARATUS

CROSS REFERENCE TO RELATED APPLICATIONS

This application claims the priority of U.S. Provisional Application Ser. No. 60/820,268 entitled "Intercept: Dog Feces Collector" filed on Jul. 25, 2006 the entire contents and substance of which are hereby incorporated in total by reference.

BACKGROUND OF THE INVENTION

1. Field of the Invention

This invention deals with the sanitary collection and disposal of animal feces and whose basic principles are to intercept the feces with a bag before it reaches the ground, and provide a sanitary manner to seal and dispose of the bag.

2. Description of Related Art

According to the Humane Society of the United States there are "approximately 73 million dogs owned in the United States". Animal waste, and dog waste in particular, creates pollution to the environment especially in urban areas where bacterial contamination can pose health risks to humans and other animals. The present invention helps alleviate this problem. It is a light weight device which is easy and sanitary to use and is environmentally friendly. The operator does not have to come in close contact with the fecal matter or handle the bag once the feces is in it. The invention is, therefore, very hygienic and convenient for the user and will encourage greater compliance of pooper scooper laws. Fines for breaking these laws in most cities can be up to $150.

Prior attempts have been made to solve this important problem of collecting canine fecal matter in a sanitary manner. However, they all appear to have shortcomings.

U.S. Pat. No. 7,090,268 includes a drawing showing a dog standing up and excreting into a device held inches from the ground. Dogs usually squat before and while defecating, placing their rear very close to the ground. This fact makes the use of this device very cumbersome. The operator would have trouble getting it into a functional position under the dog. Another important point is how securely the bag is mounted on to the device. Without a robust method of securing the bag, it could easily fall off the device as the dog moves around. In addition the operator would have to put the device down and use two hands to tie the bag before disposal. This can be difficult while at the same time controlling a dog on a leash.

U.S. Pat. No. 5,403,050 describes a system requiring a bag to completely open up flat on the ground to catch the animal waste. But once opened, the bag is too big to be centrally placed under a dog without touching its hind legs. The only possible placement would result with the waste landing on the edge of the opened bag, which may cause it to easily fall off. The present invention, however, allows the user to place the bag squarely under the rump of the dog without any interference to the animal.

U.S. Pat. No. 5,779,290 describes a device that requires the user to physically remove the bag from the device and seal it. The present invention, however, closes and seals the bag without the need of the user to touch the bag, keeping the process completely sanitary and hygienic. The mention of a wheel in a possible embodiment to support the device described in U.S. Pat. No. 5,779,290 implies its weight might be more than desirable for a long walk with a dog.

Of possible general, but probably lesser, relevance are the inventions described in U.S. Pat. Nos. 4,852,924, 5,683,129, 5,718,469, 5,971,452, 6,039,370, 6,386,606 6,554,335, 6,471,267, 6,485,073 and 6,702,349.

The principle shortcoming of the prior art is that the user must handle the bag containing the dog excrement in order to remove it from the device and seal it before disposal. These tasks can be unsanitary, cumbersome, and somewhat difficult while at the same time controlling a dog on a leash.

SUMMARY OF THE INVENTION

Briefly described, the invention, also referred to herein as the "Intercept", is a sanitary system for collecting animal waste. It is comprised of a bag that is designed to fit on to the arms of the apparatus. This apparatus holds, seals, and disposes of the bag. Once the bag is loaded on to the apparatus, the user does not have to touch it again. In addition, it is easy for the user to place the invention under the animal while excreting.

The device consists of a hollow shaft or tube with a handle at one end and an oval shaped set of arms at the other. The arms hold a plastic bag, which is later closed and sealed by retracting the arms into the tube. The bag is finally released into a waste receptacle once the arms are fully retracted. To assist with the collection of feces at night there is a LED a the tip of the tube close to the bag which is controlled by a switch in the handle. This clearly illuminates the area where the dog is excreting.

The arms are made of a material that retains a memory of its initial oval shape, and will return to that shape once the arms are extended from the tube. The bag has 2 to 2½ inch sleeves to the left and the right of the opening at the top through which the arms of the invention are threaded. When the slider is moved along the tube this controls the opening and closing of the device. The bag's adhesive strip on the top inner edge creates a seal, isolating the waste even after it leaves the device. It also helps contain the odor of the feces. Overall the device is easy to manufacture and market and economical sound for pet owners.

The preferred embodiment of the invention may be more fully understood by reference to the following drawings.

BRIEF DESCRIPTION OF THE DRAWINGS

FIG. 1A illustrates the preferred embodiment of the invention with the arms in a retracted position.

FIG. 1B shows the device with the arms extended.

FIG. 3A demonstrates how a user would load the bag.

DETAILED DESCRIPTION OF THE PREFERRED EMBODIMENT

Figure 1C:
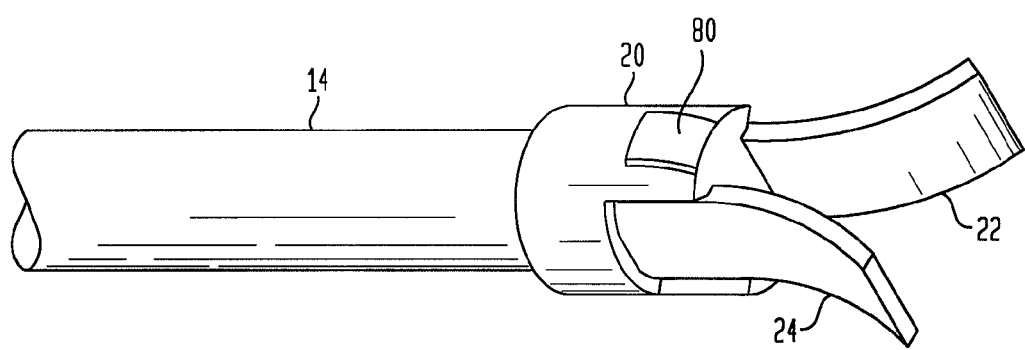
FIG. 1C is a detailed view of the tip of the invention with the arms in the position for loading the bag.

During the course of this description like numbers will be used to identify like elements according to the different views which illustrate the invention.

The preferred embodiment of the invention 10 is illustrated in FIG. 1A and will be further described in FIG. 1B through FIG. 4. The invention 10 is a system for the sanitary collection of animal waste which is comprised of self sealing bags 40 and a device 10 to hold, close and seal them.

FIG. 1A is an underside view of the preferred embodiment of the invention 10 with the arms 26 in a retracted position. A slider 16 fits around the hollow shaft or tube 14, and is connected through the slot 18 to the arms 26 with a pin 78. The tip 20 spreads the arms 26 so that the bag 40 can be easily loaded, and also peels off the bag 40 as the arms are retracted back into the tube 14. A handle 12 is attached to the other side of the tube 14 and encases lithium batteries 72 and an on/off switch 74. The tube 14 is approximately eighteen inches in length and is preferably made of an anodized 6061 aluminum alloy, synthetic fiber, plastic, or other alloys of aluminum.

FIG. 1B illustrates the topside of the invention 10 with the arms 26 (L22,R24) extended. The arms 26 are made of a acetal resin engineering plastic known as Delrin®, manufactured by Dupont. To help the arms retain their oval shape, the Delrin® is mixed with a percentage of glass in the 10 to 25 percent range. The preferable size of the oval formed by the arms is approximately seven inches long by five inches wide.

FIG. 1C is a detailed view of the tip 20 showing a hook 80 and the arms 26 in a position ready for loading the bag 40 onto the device 10. The hook 80 is used to hold the bag 40 while the user extends the arms 26 through its sleeves 46 and 48.

Figure 2A:
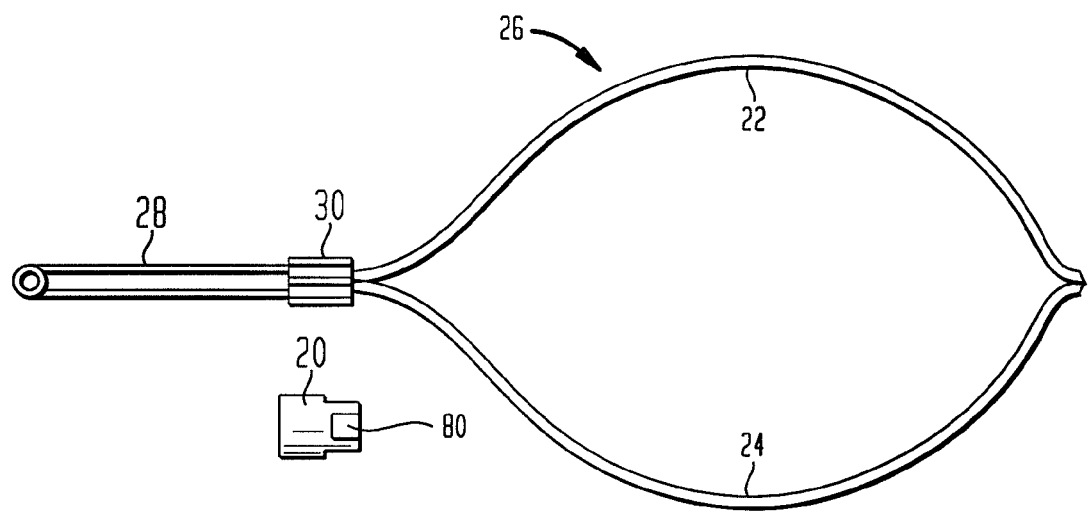
FIG. 2A shows the arms component apart from the device.

FIG. 2A illustrates the complete arms component 26 apart from the device. It consists of a shaft 28 which attaches to the slider 16 on the outside of the tube 14, two arms 22 and 24, and a guide 30 to help the movement of the arms 26 through the tube 14.

Figure 2B:
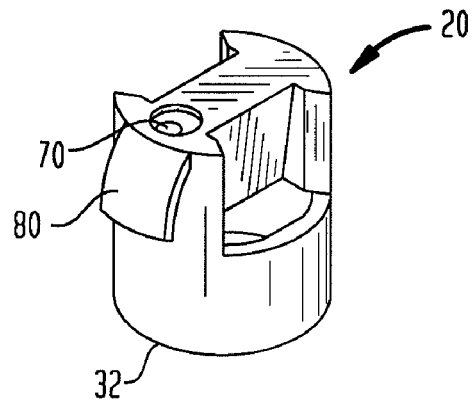
FIG. 2B is a perspective view of the tip that is attached to the tube with the opening for an LED.

FIG. 2B is a perspective view of the tip component 20 with a base 32 that is attached to the tube 14, an LED 70, and the hook 80 at the top that is used to hold the bag 40 during loading.

Figure 2C:
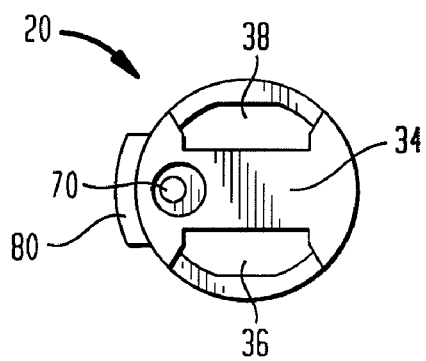
FIG. 2C is a front view of the tip showing the openings for the arms and the opening for an LED.

FIG. 2C is a front view of the tip 20 showing the two openings 36 & 38 through which the arms 22 and 24, respectively pass. The wedge between the openings 34 which is responsible for spreading the arms are also shown.

Figure 2D:
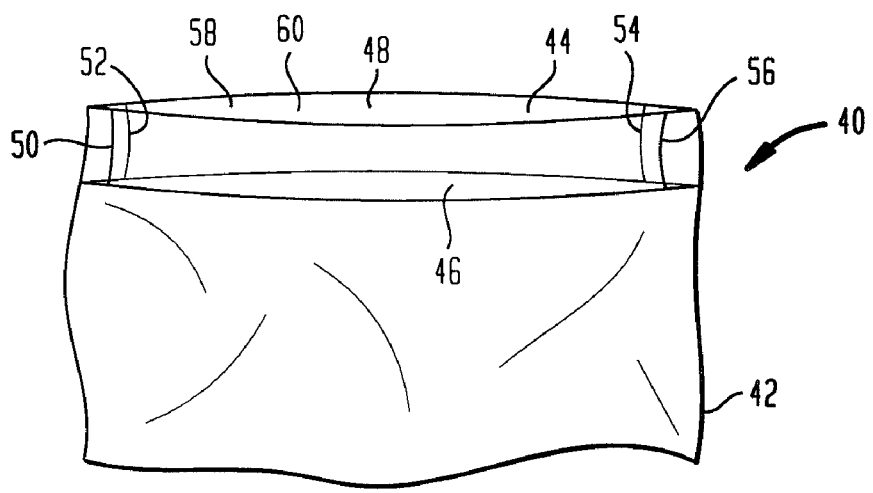
FIG. 2D illustrates a bag suitable for use with this invention.

FIG. 2D illustrates the preferred embodiment of the bag 40 and its features. It is made of Polyethylene plastic, or another material which may or may not be biodegradable. At either side of the opening 44 at the top are sleeves 46 and 48 approximately 2 to 2½ inches deep with openings 50 and 52 at one end, and 54 and 56 at the other. A strip of adhesive 58 with its covering 60 is located at the top inner edge of the bag 40. The preferred size of the body of the bag 40 is seven inches deep and eleven inches long when laying flat. The opening at the top of the bag 44 is approximately seven inches in diameter when opened.

FIG. 3A through 3J illustrates how the user would prepare and use the invention 10.

FIG. 3A shows the user beginning to load the plastic bag 40 onto invention 10. This is done by threading each of the sleeves' openings 54 and 56 onto the arms 22 and 24 which are extended approximately one inch from the tube. The loop at the end of the bag 40 is placed over the hook 80.

Figure 3B:
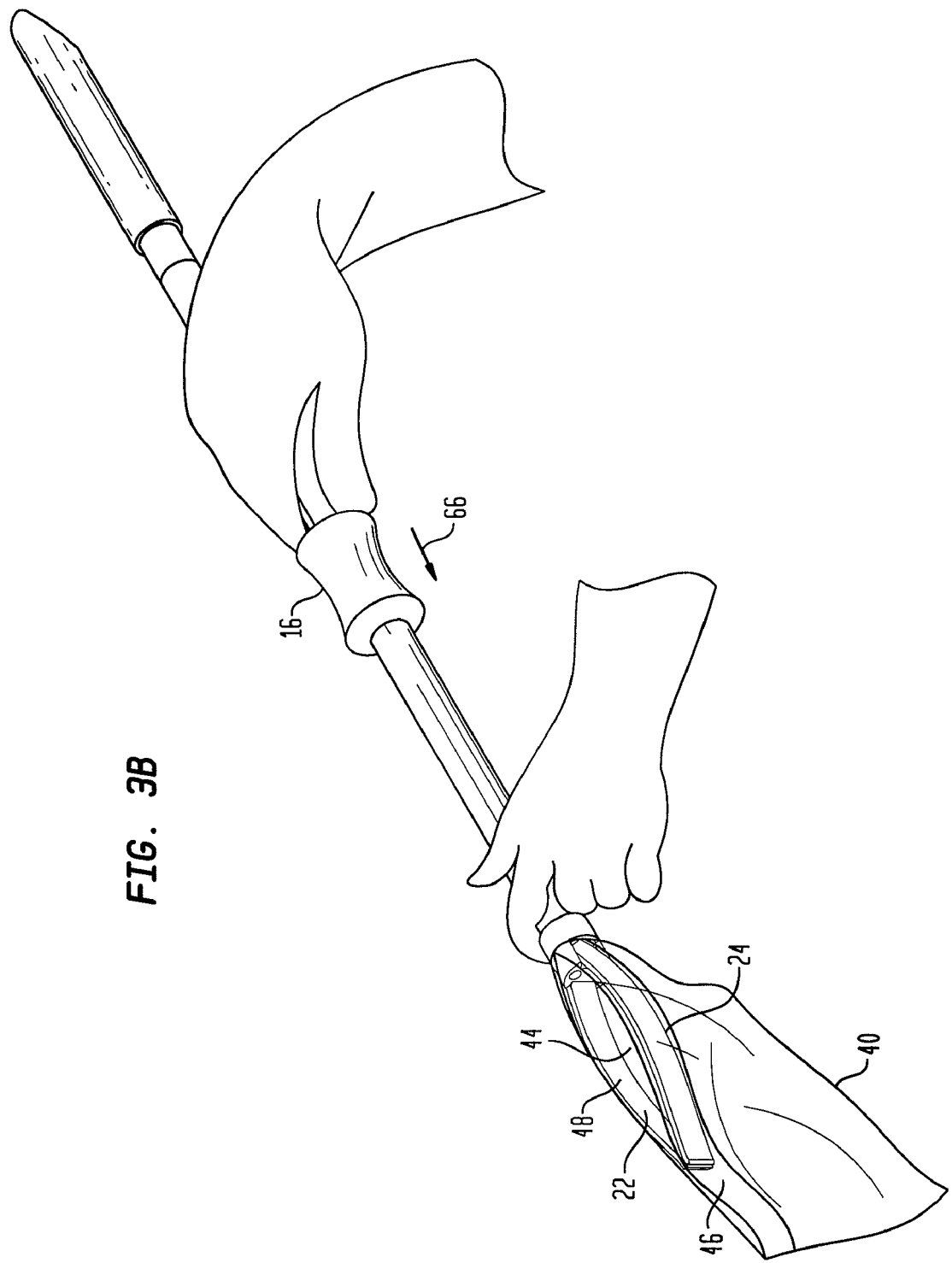
FIG. 3B illustrates the second step of how a user would load the bag.

FIG. 3B illustrates the user pushing the slider 16 downwards in the direction of arrow 66 with one hand while they hold the handle or shaft 14 of invention 10 with the other. This action extends the arms 22 and 24 through the complete length of the sleeves 46 and 48 and fully loads the bag 40 on to the device 10. At this point the end of the bag 40 is removed from the hook 80.

Figure 3C:
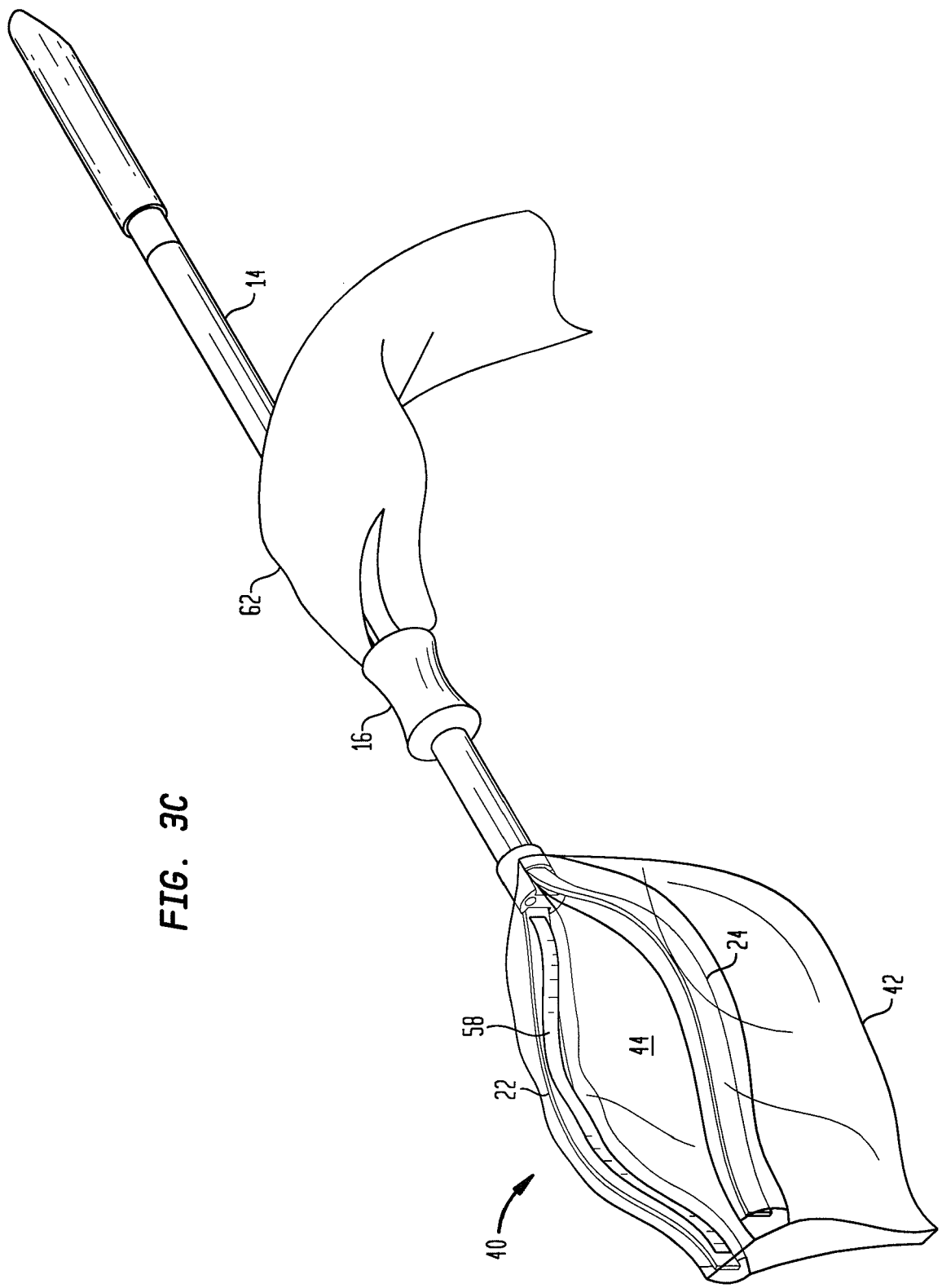
FIG. 3C illustrates the bag fully loaded onto the device.

FIG. 3C shows the bag 40 fully loaded onto the extended arms 22 and 24 with the bag 40 now opened 44 in preparation for use.

Figure 3D:
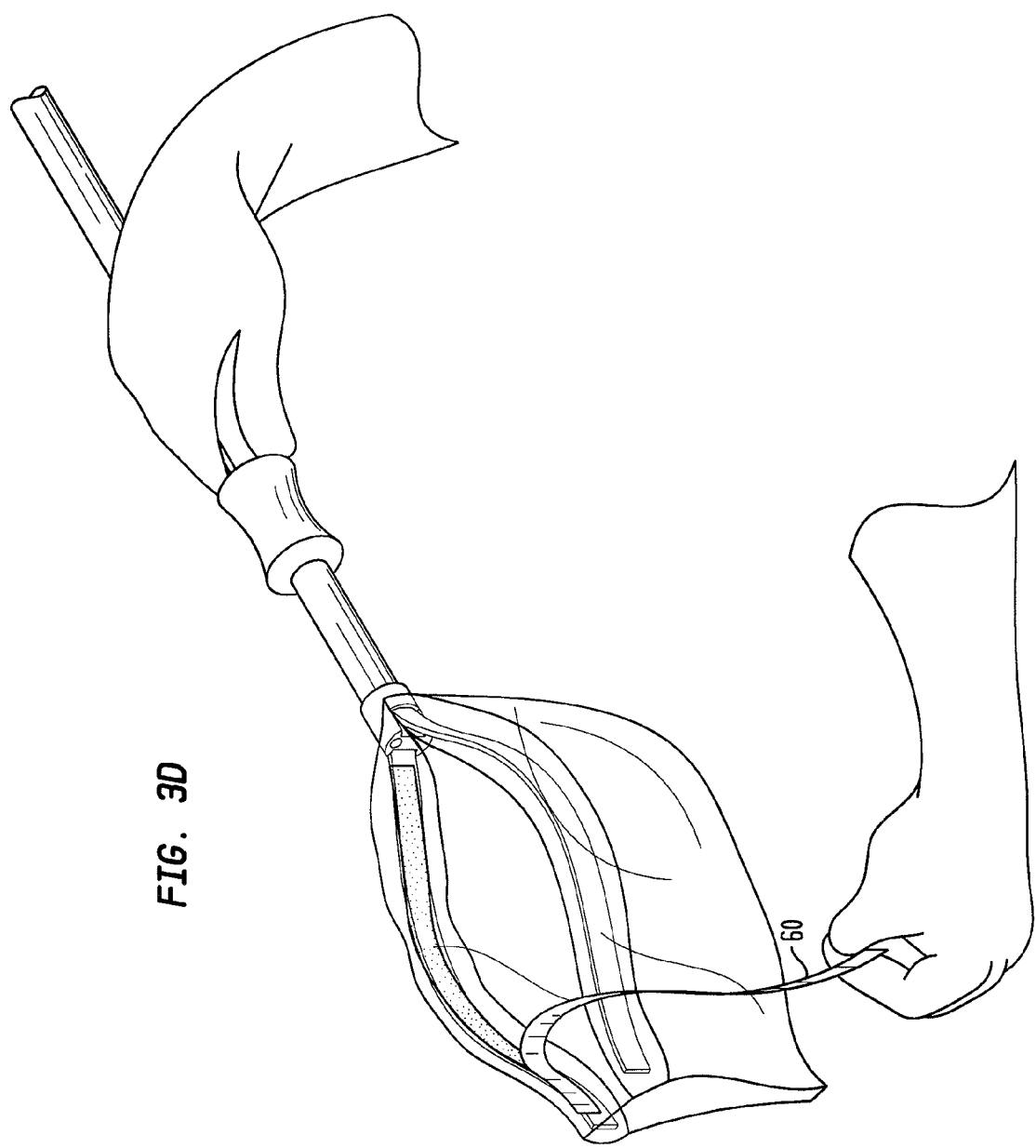
FIG. 3D shows a user peeling off the covering of the adhesive strip.

FIG. 3D illustrates the user peeling off the protective cover 60 of the adhesive strip 58 at the top inside edge of the bag 40, completing the preparation for use. The adhesive strip 58 creates an odor proof seal with maximum isolation of the waste once the bag is closed with the device.

Figure 3E:
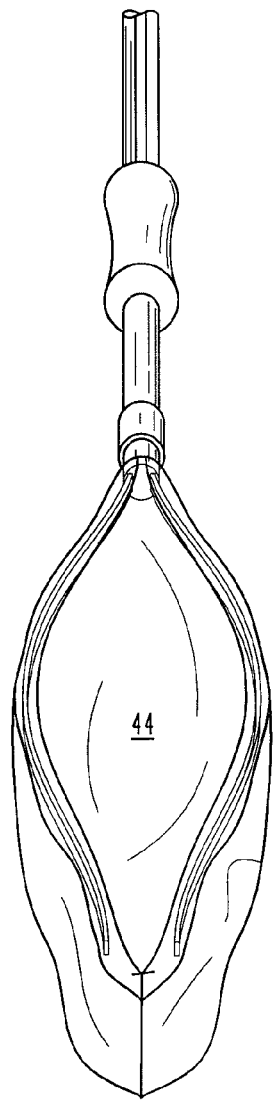
FIG. 3E is a top perspective view showing an open bag supported by the retractable arms.

FIG. 3E illustrates how the prepared device 10 with the open bag 44 would be held once the animal shows signs of excreting. The bag 40 is placed under the rear of the animal to intercept the feces before it reaches the ground.

Figure 3F:
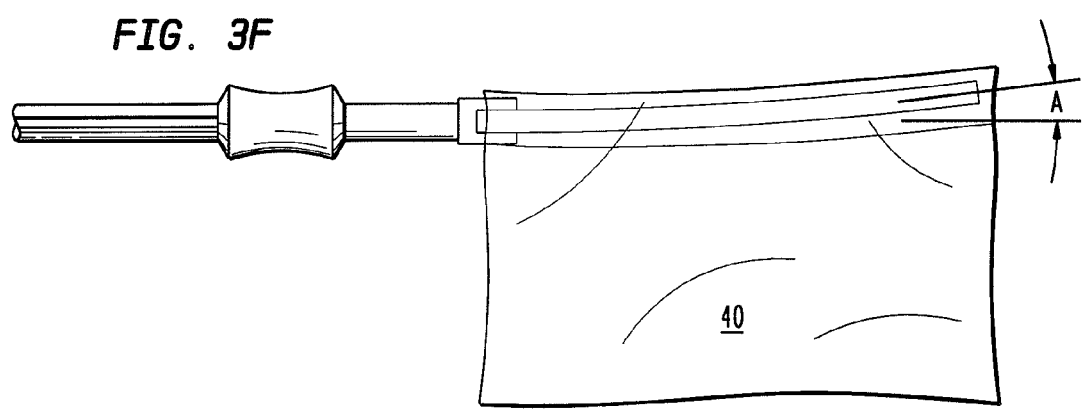
FIG. 3F demonstrates the ability of the arms of the device to be pressed flat to the ground.

FIG. 3F is a side elevational view of the device with the loaded bag 40 just before use. The users would complete this preparation before walking the dog, and then carry the loaded device along with them. This exemplary depiction also shows an angle A between the shaft's 14 long central axis and the extended arms 22, 24 which allow more natural positioning of said bag 40 to intercept animal waste. In an embodiment of the invention, angle A lies in the range of 5-15 degrees.

Figure 3G:
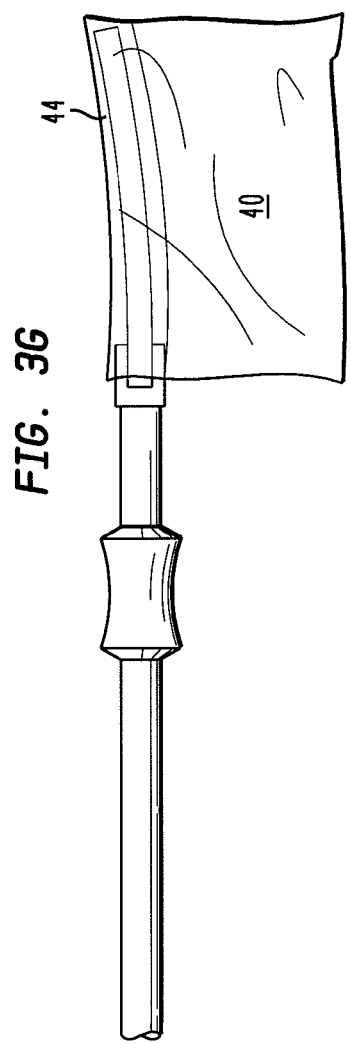
FIG. 3G shows the bag with collected material inside the body of the bag.
Figure 3H:
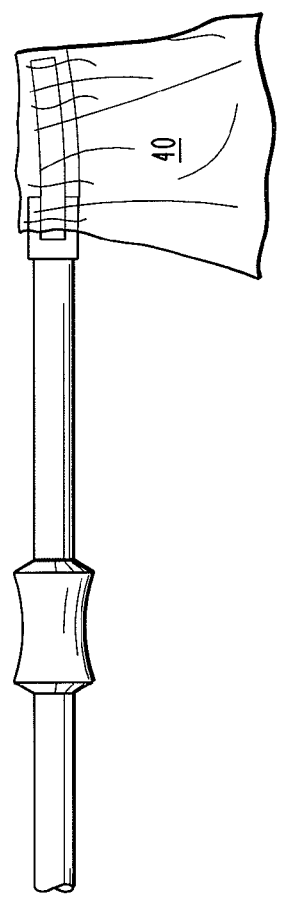
FIG. 3H illustrates the bag being closed while the arms are being retracted
Figure 3I:
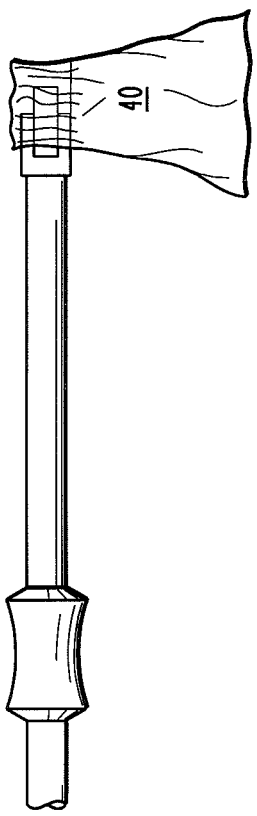
FIG. 3I shows the completely closed bag with the arms retracted to the 'transport' position.

FIG. 3G through 3I illustrates how the user would close the bag 40 after collecting the feces. This is done by moving the slider 16 towards the handle 12, retracting the arms 22 and 24 to a position approximately three inches outside the tube, causing the bag to close and the adhesive 58 to stick on the opposite side of the bag 40, sealing it. The device 10 is now ready to transport the feces to a disposal receptacle.

Figure 3J:
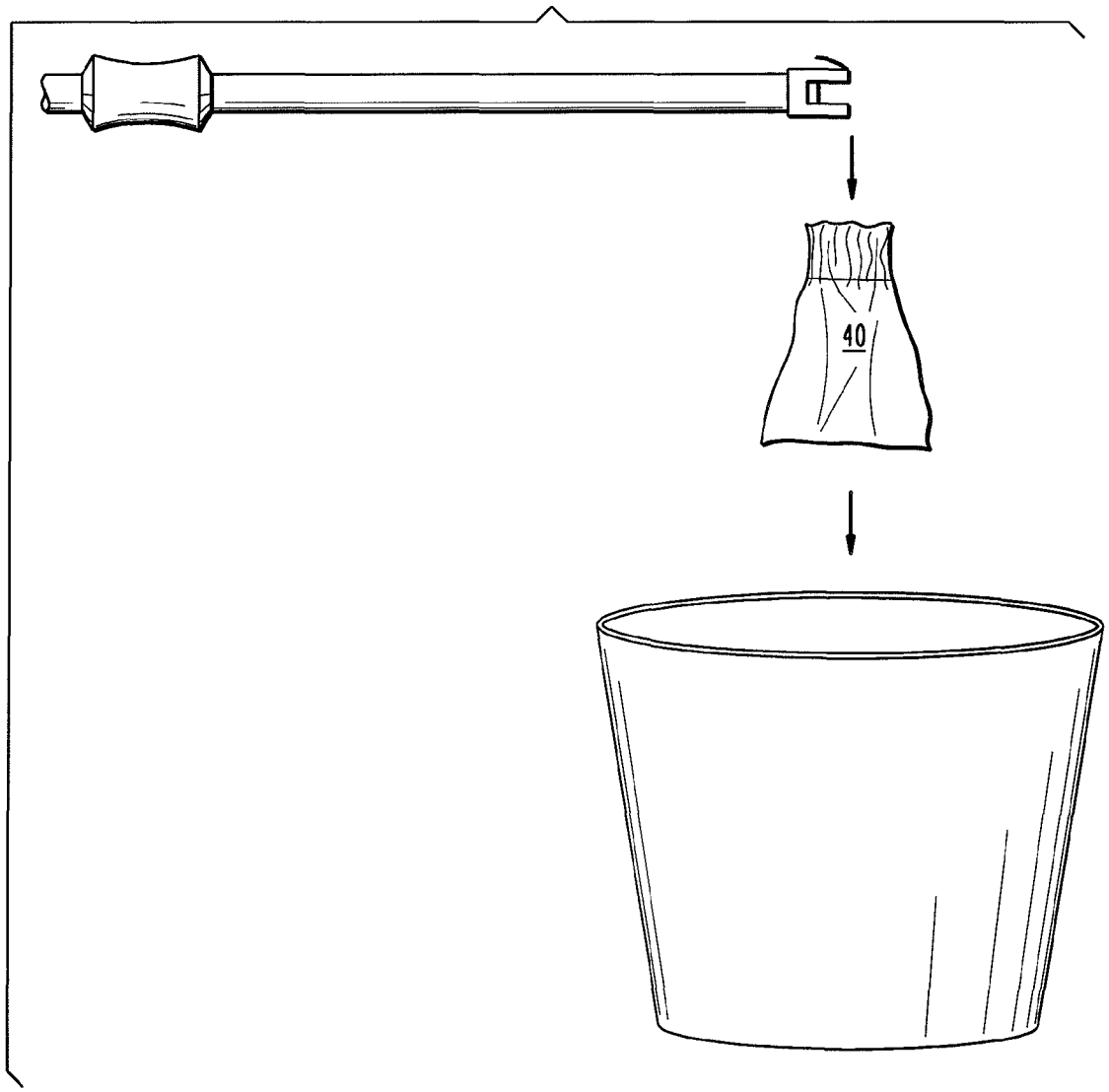
FIG. 3J demonstrates how the fully retracted arms release the bag from the device into the disposal receptacle.

FIG. 3J demonstrates the disposal of the bag 40 containing the feces. The slider 16 is moved all the way towards the handle 12, retracting the arms 22 and 24 completely into the tube 14 thus releasing the sealed bag 40 into the waste receptacle.

Figure 4:
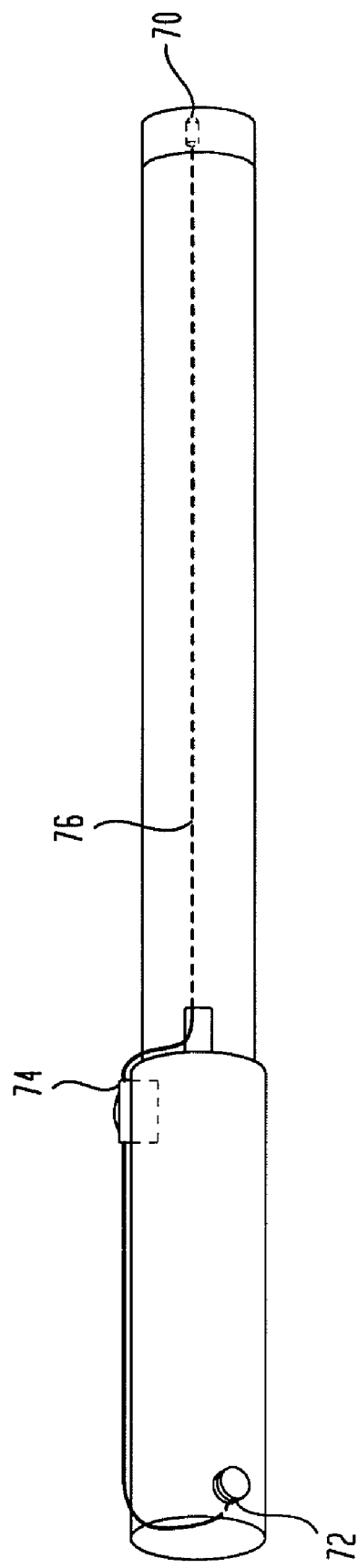
FIG. 4 illustrates electronics of the invention which controls the LED.

FIG. 4 illustrates the electronic aspect of the invention 10. It consists of two 3.5 volt lithium batteries 72, a tactile switch 74 housed in the handle 12 and a wire 76 which runs through the body of the shaft 14 and connects the lithium batteries 72 and switch 74 in the handle 12 with the LED 70 in the tip. The illumination from the LED 70 component provides a convenient way to use the device at night.

The invention 10 has been described with specific embodiments, however, many variations, modifications etc. can be made by those skilled in the art. For example, the handle 12, arms 26 and hollow tube 14 may be made of alternate materials such as synthetic fiber, plastic, and other types of aluminum. In addition, the bag 40 may also be made from a variety of materials, some of which may be biodegradable. This invention 10 is intended to embrace all such alternatives, modifications within the spirit and scope of the following claims.

The invention 10 just described has many distinct advantages over prior art. It is made of light weight materials, is easy to manufacture and market, and economically practical for pet owners. It embodies a hygienic and sanitary manner of disposing fecal matter. It appears that many prior art would need two operators: one to care for the dog while the other tends to the releasing and tying of the bag before disposal. The invention 10 is time saving as the bag 40 can be loaded on the device 10 in a matter of seconds, and easily released with a pull of the slider 16. The invention also allows for the dog owner to conveniently walk their dog while using the device 10. The invention 10 also protects the device itself from being soiled while in use. The invention 10 embodies environmentally friendly features which are advantageous to humans and other animals and protects the environment from animal waste pollution. Because of its ease of use it promotes greater compliance of Pooper Scooper Laws especially in urban environments.

While the invention has been described with reference to the preferred embodiment thereof, it will be appreciated by those of ordinary skill in the art that modifications can be made to the structure and elements of the invention without departing from the spirit and scope of the invention as a whole.

The invention claimed is:

1. An animal waste collecting apparatus comprising:
   a substantially hollow shaft having a first and a second end;
   a slider mounted on said shaft said slider having a portion that surrounds said shaft; and,
   a first and second arm receivable in said shaft
   wherein movement of said slider from said first end towards said second end of said hollow shaft lengthens the apparatus by extending said arms from said second end so that said arms can engage a receptacle for intercepting said animal waste.

2. The apparatus of claim 1 wherein said first and second arms are made of a resilient material that changes shape as it extends out of said hollow shaft.

3. The apparatus of claim 2 wherein said aims when fully extended from said shaft are curved in opposite directions towards each other.

4. The apparatus of claim 3 wherein said receptacle comprises a bag having an opening for receiving said animal waste, said bag further having a first aim channel and a second arm channel on opposite sides of said bag opening each channel having a first and a second aperture respectively for receiving said first and second arms when said arms are extended from said hollow shaft.

5. The apparatus of claim 4 wherein said bag includes adhesive on the inside of said opening so that as said arms are withdrawn from said, bag said opening automatically seals itself and said bag is released from said apparatus for easy disposal.

6. The apparatus of claim 5 wherein said first and second arms when extended have a curved, generally "C" shape and wherein said C shaped arms face in opposite directions so as to hold the bag open when the arms are extended.

7. The apparatus of claim 6 further comprising:
   lighting means located at the said second end of said shaft for selectively illuminating said bag.

8. The apparatus of claim 7 further comprising:
   a handle located at said first end of said shaft for gripping said shaft.

9. The apparatus of claim 8 wherein said lighting means comprises an LED.

10. The apparatus of claim 9 further comprising:
    a battery connected to said LED; and,
    a switch means connected to said battery and said LED for selectively turning said LED on and off.

11. The apparatus of claim 10 wherein said first and second arms each have a first end and a second free end and wherein said first ends are connected together and the arms are formed from a single, continuous piece of resilient plastic.

12. The apparatus of claim 11 wherein said second, free ends of the first and second arms each have tips that flare away from each other.

13. The apparatus of claim 12 wherein said shaft has a long central axis and said extended arms lie is a plane that in at an angle A with respect to said axis so that said bag may be positioned more naturally when intercepting said animal waste.

14. The apparatus of claim 13 wherein said angle A lies in the range of 5-15 degrees.

15. The apparatus of claim 14 wherein said plastic material comprising said first and second arms is a combination of Delrin® mixed with glass in the 10-25% range.

16. The apparatus of claim 15 wherein when said first and second arms are extended from said shaft they form an oval opening for the bag having a size of approximately 5 inches by 7 inches.

17. An animal waste collecting apparatus comprising:
    a substantially hollow shaft having a first and a second end;
    a slider mounted on said shaft;
    a first and second arm receivable in said shaft, said first and second arms made of a resilient material that changes shape as it extends out of said hollow shaft and said arms when fully extended from said shaft curved in opposite directions towards each other, said first and second arms when extended having a curved, generally "C" shape and wherein said C-shaped arms face in opposite directions so as to hold a bag open when the arms are extended;
    lighting means further comprising an LED located at said second end of said shaft for selectively illuminating said bag;
    a battery connected to said LED;
    a switch means connected to said battery and said LED for selectively turning said LED on and off;
    a handle located at said first end of said shaft for gripping said shaft; and
    a plug tip that fits in the second end of said hollow shaft, said plug tip including a first and a second aperture therein for slideably receiving said first and second arms respectively;
    wherein movement of said slider from said first end towards said second end of said hollow shaft extends said arms from said second end so that said arms can engage a receptacle for intercepting said animal waste, said receptacle comprising a bag having an opening for receiving said animal waste, said bag further having a first arm channel and a second arm channel on opposite sides of said bag opening each channel having a first and a second aperture respectively for receiving said first and second arms when said arms are extended from said hollow shaft and including adhesive on the inside of said opening so that as said arms are withdrawn from said bag, said opening automatically seals itself and said bag is released from said apparatus for easy disposal;
    wherein said first and second arms each have a first end and a second free end and wherein said first ends are connected together and the arms are formed from a single, continuous piece of resilient plastic, said plastic being a combination of Delrin mixed with glass in the 10-25% range, said second free ends of the first and second arms each have tips that flare away from each other;
    wherein said shaft has a long central axis and said extended arms lie in a plane that is at an angle A with respect to said axis so that said bag may be positioned more naturally when intercepting said animal waste; and wherein when said first and second arms are extended from said shaft they form an oval opening for the bag having a size of approximately 5 inches by 7 inches.

18. The apparatus of claim 17 wherein said LED switch means is located in said handle.

19. The apparatus of claim 18 further comprising;

hook means attached to said plug tip to assist in holding said bag as said arms are threaded into said first arm channel and said second arm channel, respectively.

20. An animal waste collecting apparatus comprising:

a substantially hollow shaft having a first and a second end;

a slider mounted on said shaft;

a first and second arm receivable in said shaft, said first and second arms made of a resilient material, said first and second arms when extended having a curved, generally "C" shape wherein said C-shaped arms face in opposite directions so as to hold a receptacle bag open when the arms are extended;

said receptacle bag having an opening for receiving said animal waste, said bag further having a first arm channel and a second arm channel on opposite sides of said bag opening each channel having a first and a second aperture respectively for receiving said first and second arms when said arms are extended from said hollow shaft and including adhesive on the inside of said opening so that as said arms are withdrawn from said bag, said opening automatically seals itself and said bag is released from said apparatus for easy disposal;

lighting means further comprising an LED located at said second end of said shaft for selectively illuminating said bag;

a battery connected to said LED;

a switch means connected to said battery and said LED for selectively turning said LED on and off;

a handle located at said first end of said shaft for gripping said shaft; and a plug tip that fits in the second end of said hollow shaft, said plug tip including a first and a second aperture therein for slideably receiving said first and second arms respectively.

\* \* \* \* \*

UNITED STATES PATENT AND TRADEMARK OFFICE
CERTIFICATE OF CORRECTION

PATENT NO. : 7,854,455 B2  Page 1 of 1
APPLICATION NO. : 12/092470
DATED : December 21, 2010
INVENTOR(S) : Monica Ruscil et al.

It is certified that error appears in the above-identified patent and that said Letters Patent is hereby corrected as shown below:

On the title page item (73), Assignee should be listed as:

SMART DOG L.L.C.
306 Eighth Avenue
Asbury Park, New Jersey 07712

Signed and Sealed this
Seventeenth Day of May, 2011

David J. Kappos
*Director of the United States Patent and Trademark Office*